United States Patent
Prabu et al.

(10) Patent No.: US 9,847,881 B2
(45) Date of Patent: Dec. 19, 2017

(54) SET TOP BOX WITH SHARING OF EXTERNAL HARD DISK DRIVE

(71) Applicant: ARRIS Enterprises, Inc., Suwanee, GA (US)

(72) Inventors: Mahadevan Venkatesh Prabu, Bangalore (IN); Belmannu Harekrishna Acharya, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 80 days.

(21) Appl. No.: 14/856,096

(22) Filed: Sep. 16, 2015

(65) Prior Publication Data
US 2017/0078096 A1 Mar. 16, 2017

(51) Int. Cl.
| | |
|---|---|
| *G06F 21/00* | (2013.01) |
| *H04L 9/32* | (2006.01) |
| *G06F 3/06* | (2006.01) |
| *G06F 21/44* | (2013.01) |
| *G06F 21/33* | (2013.01) |
| *G06F 21/80* | (2013.01) |

(52) U.S. Cl.
CPC .......... *H04L 9/3213* (2013.01); *G06F 3/0623* (2013.01); *G06F 3/0647* (2013.01); *G06F 3/0689* (2013.01); *G06F 21/335* (2013.01); *G06F 21/44* (2013.01); *G06F 21/80* (2013.01); *G06F 2221/2107* (2013.01)

(58) Field of Classification Search
CPC ... H04L 9/3213; G06F 3/0623; G06F 3/0647; G06F 3/0689; G06F 21/44; G06F 21/335; G06F 21/80; G06F 2221/2107
See application file for complete search history.

(56) References Cited

U.S. PATENT DOCUMENTS

| | | | | |
|---|---|---|---|---|
| 7,647,507 | B1 | 1/2010 | Feng | |
| 8,615,794 | B1* | 12/2013 | Tomilson | G06F 21/44 713/182 |
| 2002/0013864 | A1* | 1/2002 | Dandrea | G06F 3/0613 710/6 |
| 2002/0161974 | A1* | 10/2002 | Sako | G06F 3/0613 711/114 |

(Continued)

*Primary Examiner* — Don Zhao
(74) *Attorney, Agent, or Firm* — Lary T. Cullen (57) ABSTRACT

An audio/video content management apparatus, for use with an external hard drive, includes a control circuit that performs a trust token generation operation. The trust token generation operation includes obtaining first identification information and hard drive identification information, encrypting and combining the first identification information and the hard drive identification information as a trust token, and sending the trust token to the external hard drive. The control circuit also performs a trust token validation operation including obtaining the first identification information, the hard drive identification information, and the trust token from the external hard drive. The control circuit decrypts and separates the trust token into decrypted identification information and decrypted hard drive identification information, compares the decrypted identification information and the decrypted hard drive information with the first identification information and the hard drive identification information, respectively, obtained in the trust token validation operation.

19 Claims, 6 Drawing Sheets

(56) References Cited

U.S. PATENT DOCUMENTS

| | | | | |
|---|---|---|---|---|
| 2007/0070832 A1* | 3/2007 | Paikattu | ............... | G06F 3/0605 |
| | | | | 369/30.32 |
| 2009/0063802 A1* | 3/2009 | Johnson | ............... | G06F 21/31 |
| | | | | 711/164 |
| 2009/0161867 A1* | 6/2009 | Chaudhry | ............ | H04L 9/3213 |
| | | | | 380/200 |
| 2009/0271873 A1* | 10/2009 | Ram | ................. | H04L 12/1822 |
| | | | | 726/29 |
| 2010/0205448 A1* | 8/2010 | Tarhan | .................. | G06F 21/33 |
| | | | | 713/185 |
| 2012/0278566 A1* | 11/2012 | Gilson | .................. | G06F 12/00 |
| | | | | 711/159 |
| 2012/0324552 A1* | 12/2012 | Padala | ................ | H04L 9/3213 |
| | | | | 726/6 |
| 2013/0074168 A1* | 3/2013 | Hao | .................... | H04L 9/3213 |
| | | | | 726/7 |
| 2014/0372517 A1* | 12/2014 | Zuili | ................ | H04N 21/4788 |
| | | | | 709/203 |

\* cited by examiner

SET TOP BOX WITH SHARING OF EXTERNAL HARD DISK DRIVE

BACKGROUND

External hard disk drives are used as a storage extension for a digital set-top-box. The set-top-box establishes exclusive access to the hard disk drive for storing digital media content.

The set-top-box and the external hard disk drive are "trusted" to each other such that access to the external hard disk drive is limited to the trusted set-top-box for the purpose of securing content.

However, the user may want to connect the external hard disk drive to yet another set-top-box and access the already stored digital content. Currently, a different set-top box cannot access an external hard disk drive and its digital media content stored by an original set-top-box. This restriction is currently placed on set-top-boxes and hard disk drives to secure the digital media content stored in a user's external hard disk drive and prevent unauthorized access to the digital media content by other set-top-boxes. With such an arrangement, a set-top-box can record and playback the digital media content on an external hard disk drive, but usage of the external hard disk drive is restricted to that particular or single set-top-box.

However, in a set-top-box home network environment, the user may want to access the digital media content stored in the external hard disk drive from another set-top-box. The user may want to enjoy the portability of the external hard disk drive by physically moving it between different set-top-boxes available in his home. With a portable hard disk drive, it is necessary to enable access to the hard disk drive by authorized set-top-boxes while still maintaining protection against access by unauthorized set-top-boxes.

Conventional secure digital content distribution systems and secure hard drives, such as those disclosed in U.S. Pat. No. 7,647,507, help to secure the hard drive and its digital content by means of an encryption method in order to secure against content piracy. However, such systems do not provide a way to expand the accessibility of the hard drive among different player devices, but rather merely limits the access.

SUMMARY OF THE INVENTION

The present invention enables the accessibility of the hard disk drive by plural devices which are all under a trust arrangement created by the user. Also, according to the present invention, control of the accessibility of the hard disk drive and its content are by the user is greater than with a traditional content encryption method.

The present invention includes an audio/video content management apparatus for use with an external hard drive, wherein the audio content management apparatus includes an external hard drive interface circuit for detachably operationally connecting the audio/video management apparatus with the external hard drive, and a control circuit configured to perform a trust token generation operation. The trust token generation operation includes obtaining first identification information, obtaining hard drive identification information of the external hard drive, encrypting and combining at least the first identification information and the hard drive identification information as a trust token, and sending the trust token to the external hard drive via the external hard drive interface circuit.

The control circuit is also configured to perform a trust token validation operation including the following. The control circuit obtains the first identification information, obtains the hard drive identification information from the external hard drive via the external hard drive interface circuit, and obtains the trust token from the external hard drive via the external hard drive interface circuit. The control circuit decrypts and separates the trust token into at least decrypted identification information and decrypted hard drive identification information, compares the decrypted identification information with the first identification information obtained in the trust token validation operation, and compares the decrypted hard drive information with the hard drive identification information obtained in the trust token validation operation. The control circuit determines that the trust token is validated if the decrypted identification information matches the first identification information obtained in the trust token validation operation and the decrypted hard drive information matches the hard drive identification information obtained in the trust token validation operation.

The first identification information can be a personal identification character string that is input by the user via an input unit. The first identification information can alternatively be a unit address of a destination apparatus for which validation of the trust token will enable access to the external hard drive.

When the audio/video content management apparatus is the source apparatus, the destination apparatus is another audio/video content management apparatus that the user wants to be able to use to access the external hard drive. Likewise, the audio-video content management apparatus can be the destination apparatus when another audio/video content management apparatus is the source apparatus that has already established a trust with the hard drive. Therefore, control circuit of each audio/video content management apparatus can have the capability to perform both the trust token generation operation and the trust token validation operation.

The encrypting in the trust token generation operation includes encrypting with a public key, and the decrypting in the trust token validation operation includes decrypting using at least a private key.

The audio/video content management apparatus can be bundled with an external hard drive.

The present invention also includes an audio/video content management method including operationally connecting an audio/video management apparatus with an external hard drive, and performing a trust token generation operation. The trust token generation operation includes obtaining first identification information, obtaining hard drive identification information of the external hard drive, encrypting and combining at least the first identification information and the hard drive identification information as a trust token, and sending the trust token to the external hard drive.

The audio/video content management method also includes performing a trust token validation operation including obtaining the first identification information, obtaining the hard drive identification information from the external hard drive, and obtaining the trust token from the external hard drive. The trust token validation operation also includes decrypting and separating the trust token into at least decrypted identification information and decrypted hard drive identification information, comparing the decrypted identification information with the first identification information obtained in the trust token validation operation, and comparing the decrypted hard drive information with the hard drive identification information obtained in the trust token validation operation.

The trust token validation operation also includes determining that the trust token is validated if the decrypted identification information matches the first identification information obtained in the trust token validation operation and the decrypted hard drive information matches the hard drive identification information obtained in the trust token validation operation.

The present invention also includes a non-transitory computer readable medium having stored thereon a program that causes a computer to implement the audio/video content management method.

DETAILED DESCRIPTION

Figure 1:
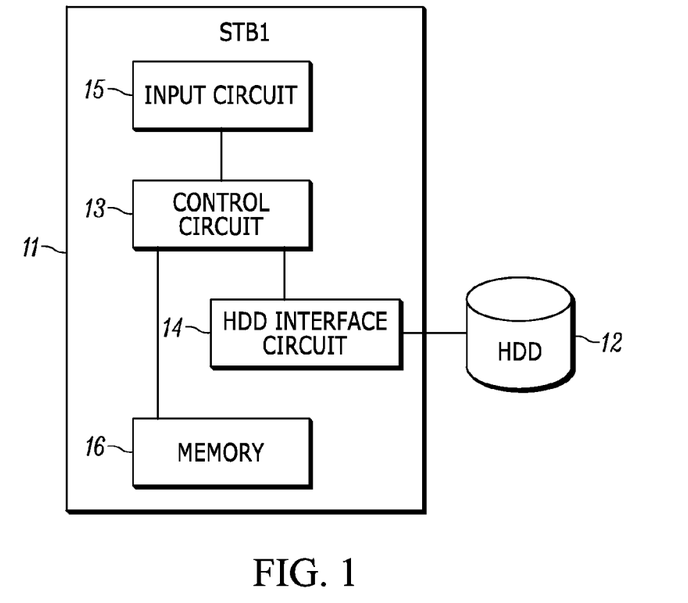
FIG. 1 is a block diagram of a system of a first embodiment of the present invention.

As shown for example in FIG. 1, the first embodiment of the present invention is a system in which one or more standalone set-top-boxes 11 (e.g., STB1 and STB2) includes control circuitry 13 to establish a trust token with an external hard disk drive (HDD) 12 having a unique identification (UID) and a user provided secured personal identification number (Pin). The trust token can be shared from a source set-top-box STB1 to a destination set-top-box STB2. Access by either set-top-box STB1 or set-top-box STB2 to the stored digital content is enabled in the external hard disk drive HDD 12 in a secured way. The control circuitry 13 communicates with the external hard disk drive 12 via an external hard drive interface circuit 14.

In order to begin shared access to the external hard disk drive HDD 12, the user provides an instruction to initiate the process. This instruction is input through an input circuit 15, which can be in the form of a physical input on the set-top-box or circuitry for accepting the input from a remote control, e.g., a user may be prompted to enter the Pin via the remote control by an on-screen display on the set-top-box instrumentation panel or an on-screen display on a display device connected to the set-top-box such as an electronic user interface. The control circuit 13 of the set-top-box STB1 generates a trust token for the hard disk drive HDD 12 and programs the trust token into the hard disk drive HDD 12 via the HDD interface circuit 14.

Figure 2:
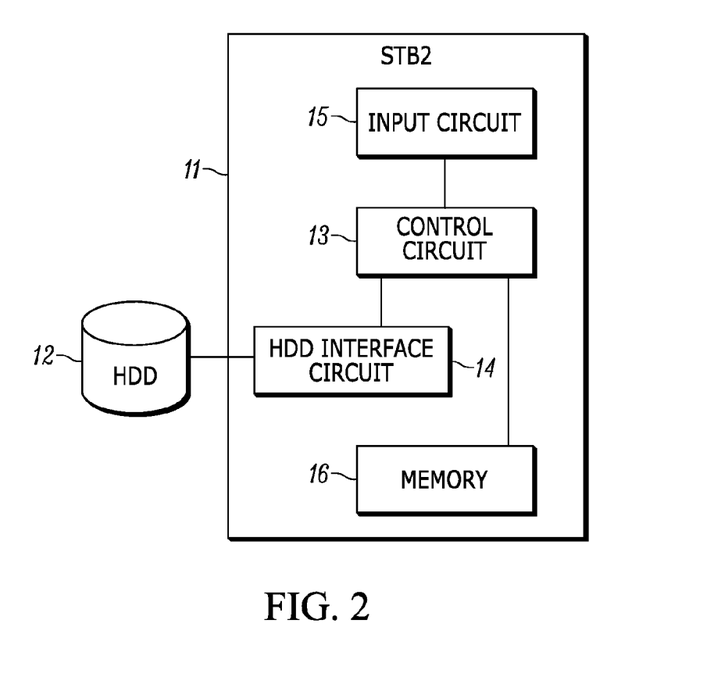
FIG. 2 is a flow chart of operation of the system of the first embodiment of the present invention.

As shown in FIG. 2, when the user connects the external hard disk drive HDD 12 to a different set-top-box STB2, which may have the same components as STB1, the secured Pin is input from the user to set-top-box STB2 via the input circuit 15, and set-top-box STB2 decodes and validates the trust token stored in the external hard disk drive HDD 12. When the validation is successful, the set-top-box STB2 is allowed to access the external hard disk drive HDD 12 and its stored digital media content.

Figure 3:
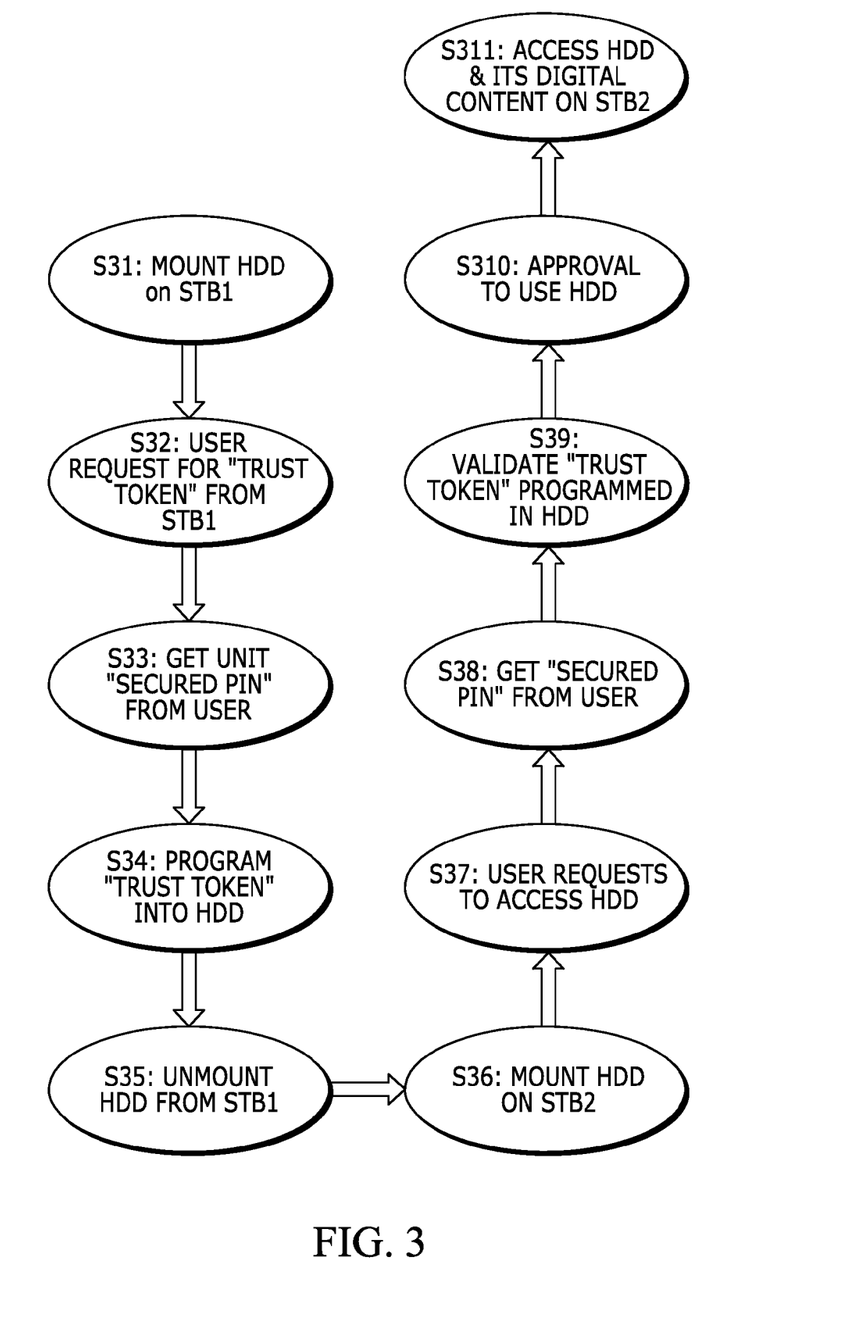
FIG. 3 is a block diagram of a system of a second embodiment of the present invention.

FIG. 3 is a flow chart showing the operation of the first embodiment. In this example, the user has the external hard disk drive HDD and is using it with the set-top-box STB1 and now wants to use the external hard disk drive HDD with a different set-top-box STB2. Currently, set-top-box STB1 and external hard disk drive HDD are trusted to each other only and not with set-top-box STB2. In this initial configuration, the external hard disk drive HDD is mounted on, i.e., operationally connected to, the set-top-box STB1 in step S31.

In step S32, the user initiates the request for trust token from the set-top-box STB1. The set-top-box STB1 obtains a secured Pin from the user in step S33. In step S34, set-top-box STB1 runs an algorithm to generate a trust token and programs the generated trust token into the external hard disk drive HDD. For example, a trust token generating algorithm could be an algorithm that combines the encrypted information of the hard disk drive HDD unique identification UID with a user provided secured Pin. Other methods for generating the trust token can be used, including the use of digital certificates. The trust token can also be a combination of a public key (from information stored in the memory 16 of set-top-box STB1) with the encrypted secured Pin and the hard disk drive HDD unique identification UID. Once the trust token is programmed into the external hard disk drive HDD, any other set-top-box can access the external hard disk drive HDD provided the user has a valid secured Pin.

In step S35, the user disconnects the external hard disk drive HDD from the set-top-box STB1 and in step S36 mounts it, i.e., operationally connects it, to set-top-box STB2. Once mounted, the user requests through set-top-box STB2 to access the external hard disk drive HDD in step S37, which instructs the set-top-box to initiate a request to validate the trust token stored in the external hard disk drive HDD. In order to validate the trust token, the set-top-box STB2 has to first trust the user and therefore requests the user to input the secured Pin in step S38.

The user inputs the secured Pin into set-top-box STB2 via the input circuit 15, and in step S39 the set-top-box STB2 validates the secured Pin using the trust token stored in the external hard disk drive HDD (and optionally a private key of the set-top-box STB2 from information stored in memory 16 of STB2) and approves it if there is a match in step S310. Once approved the set-top-box STB2 and external hard disk drive HDD are trusted to each other. Now set-top-box STB2 can access the external hard disk drive HDD and its digital media content in step S311.

Figure 4:
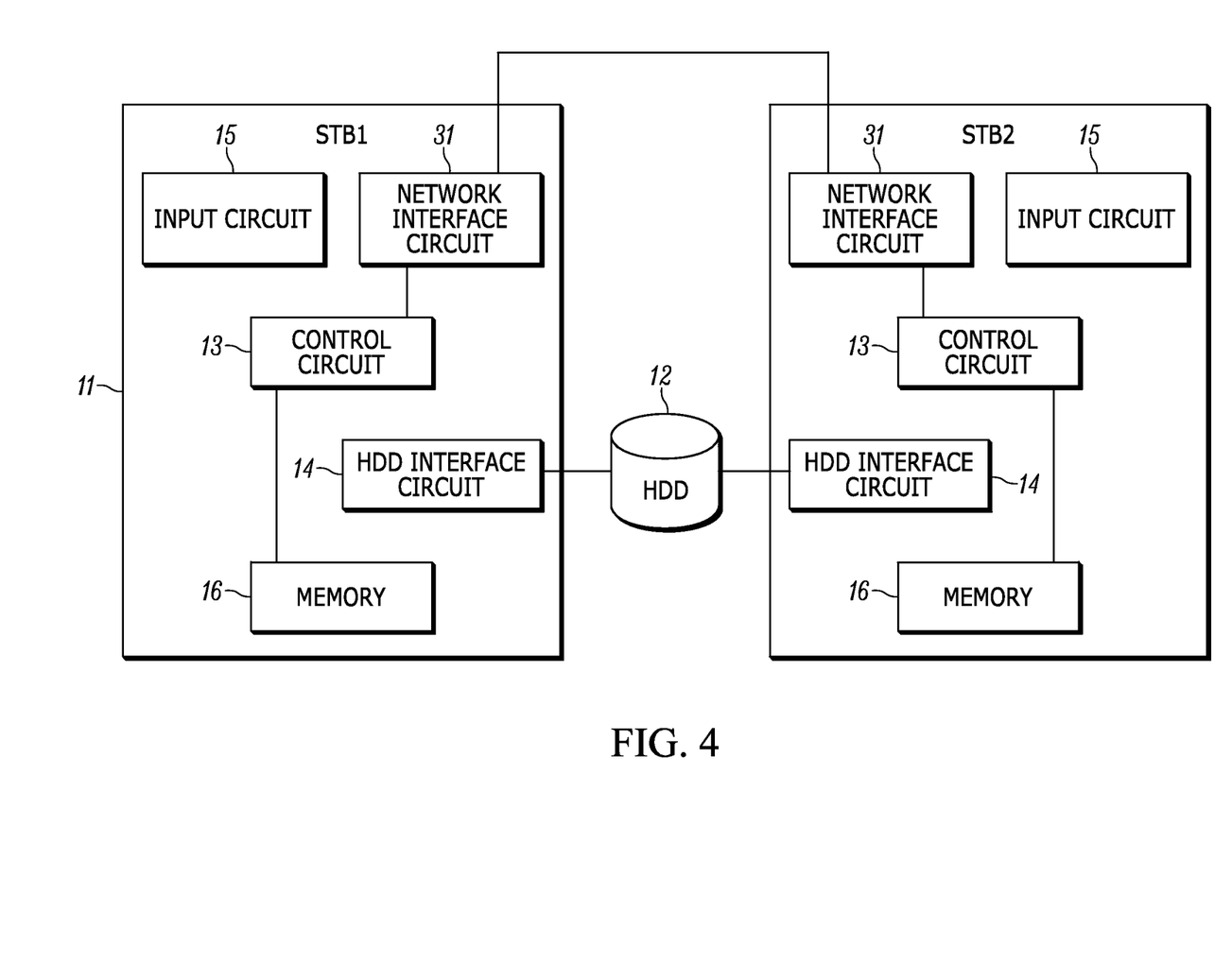
FIG. 4 is a flow chart of operation of the system of the second embodiment of the present invention.

In a second embodiment of the invention, the set-top-boxes and the external hard disk drive are network connected, by wired or wireless connection, and the trust token includes information regarding the unique identification UID of the external hard disk drive and the unit addresses of the set-top-boxes. As shown in FIG. 4, in a system in which one set top box STB1 (source) and another set-top-box STB2 (destination) are already connected on a Home Network (e.g., HMA, DLNA), the trust token can be shared from the source set-top-box STB1 to the destination set-top-box STB2 to enable access to the stored digital content in the external hard disk drive HDD 12 in a secured way.

As in the first embodiment, in order to begin shared access to the external hard disk drive HDD, the user provides an instruction to initiate the process through the input circuit 15. Note that like reference numerals in the figures denote like components. The set-top-box STB1 generates a trust token for the external hard disk drive HDD 12 and programs the trust token into the external hard disk drive HDD 12. The trust token could be generated by an algorithm that produces an encrypted combination of the unique identification UID of the external hard disk drive and the unit address UA of the other set-top-box STB2 that is the destination of where the trust needs to be established. The trust token can be based on a combination of a public key from the memory 16 of set-top-box STB1, the encrypted unit address UA of set-top-box STB2, and the unique identification UID of the external hard disk drive HDD 12. Any other method for generating the trust token can be used including the use of digital certificates.

In the second embodiment, the unit address UA of the other set-top-box STB2 could be obtained through an HMA network or DLNA network call since the two set-top-boxes STB1 and STB2 are connected on the network. This removes the need for the user to program the unit address UA of the set-top-box STB2. However, the unit address UA of the set-top-box STB2 can alternatively be programmed manually by the user via input circuit 15. When the user operationally connects the external hard disk drive HDD 12 to set-top-box STB2, the set-top-box STB2 obtains its own unit address UA and hard disk drive identification HDD ID, and decodes and validates the trust token. Once validated successfully, the set-top-box STB2 can access the external hard disk drive HDD 12 and its stored digital media content.

Figure 5:
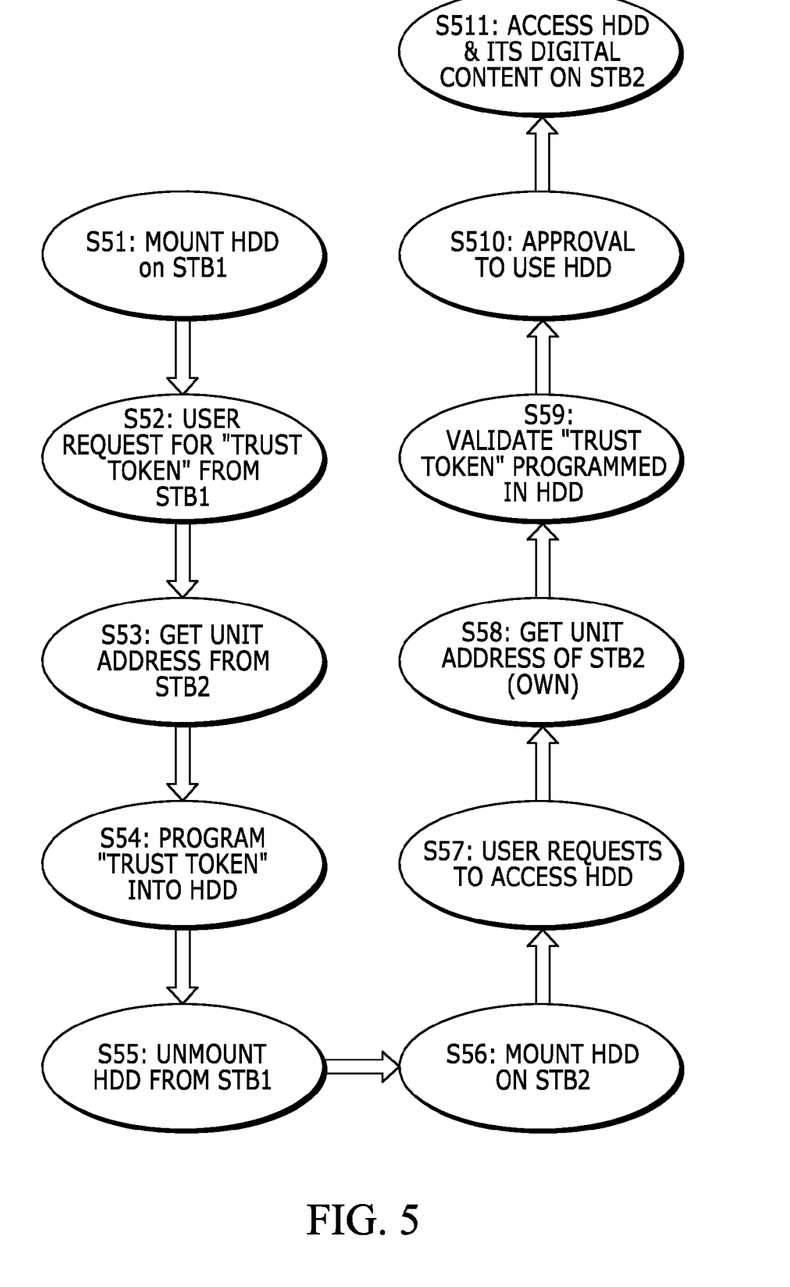
FIG. 5 is an algorithm to be implemented by the control circuit for generating a trust token.

FIG. 5 is a flow chart showing the operation of the second embodiment. In this example, the user has the external hard disk drive HDD and is using it with the set-top-box STB1 and now wants to use the external hard disk drive HDD with a different set-top-box STB2 on the network. Currently, set-top-box STB1 and external hard disk drive HDD are trusted to each other only and not with set-top-box STB2. In this initial configuration, the external hard disk drive HDD is mounted on, i.e., operationally connected to, the set-top-box STB1 in step S51.

In step S52, the user initiates the request for trust token from the set-top-box STB1. In step S53, the set-top-box STB1 obtains the unit address UA of set-top-box STB2 over the network. No manual intervention of the user is required for obtaining the unit address UA of set-top-box STB2, although the option of manual entry of the unit address UA of set-top-box STB2 via a trusted component, such as set-top-box STB1, can be provided as an optional feature. In step S54, set-top-box STB1 runs an algorithm to generate a trust token and programs the generated trust token into the external hard disk drive HDD. Once the trust token is programmed into the external hard disk drive HDD, any other set-top-box can access the external hard disk drive HDD provided the Unit Address UA of the set-top-box requesting access matches with a unit address programmed into the trust token.

In step S55, the user disconnects the external hard disk drive HDD from the set-top-box STB1 and in step S56 mounts it, i.e., operationally connects it, to set-top-box STB2. Once mounted, the user requests through set-top-box STB2 to access the external hard disk drive HDD in step S57, which instructs the set-top-box to initiate a request to validate the trust token stored in the external hard disk drive HDD. In order to validate the trust token, the set-top-box STB2 has to first trust the user and therefore obtains its own unit address, i.e., unit address of set-top-box STB2, in step S58, and performs a process to validate the trust token using the UA of set-top-box STB2 (and optionally a private key of the set-top-box STB2) in step S59, and approves it is there is a match in step S510. Once approved the set-top-box STB2 and external hard disk drive HDD are trusted to each other. Now set-top-box STB2 can access the external hard disk drive HDD and its digital media content in step S511.

Figure 6:
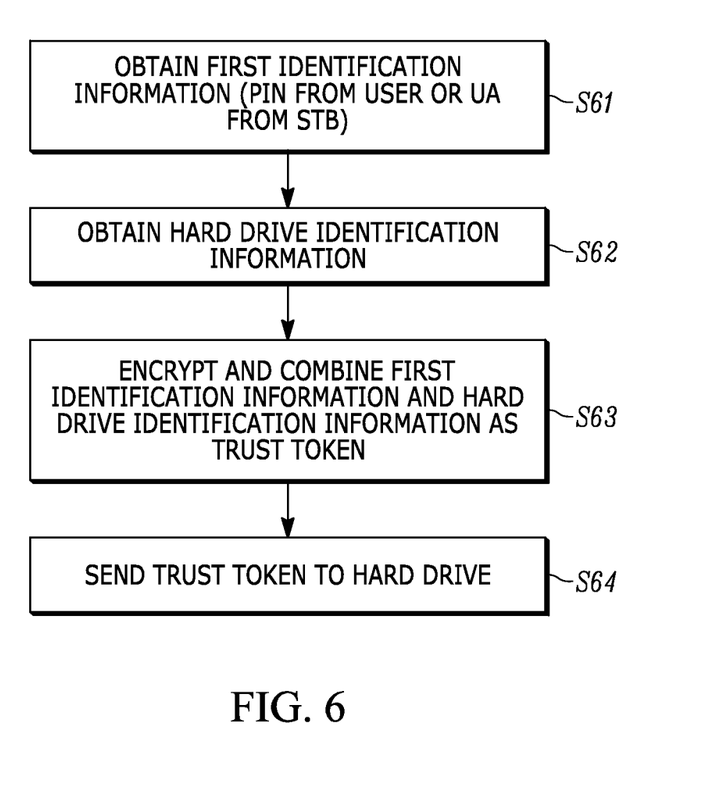
FIG. 6 is an algorithm to be implemented by the control circuit for validating the trust token.

FIG. 6 shows an example of a trust token generation algorithm implemented by the control circuit 13. In step S61, the control circuit obtains first identification information. The first identification information can be a user secured PIN in the first embodiment discussed above, or the unit address of the destination set-top-box in the second embodiment discussed above. In step S62, the control circuit obtains the hard drive unique identification information HD-UID from the hard drive 12. In step S63, the control circuit encrypts and combines the first identification information and the hard drive unique identification information as the trust token, and in step S64 sends the trust token to the hard drive 12.

Figure 7:
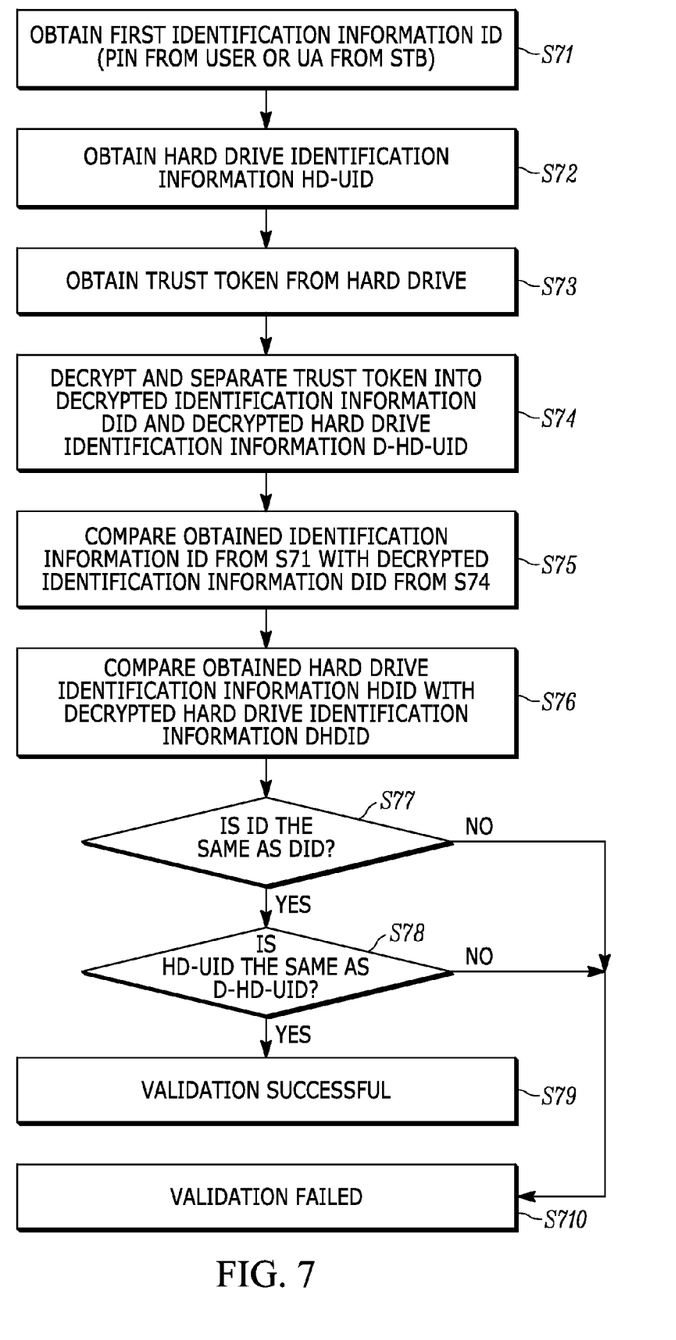
FIG. 7 shows an example of a trust token validation algorithm that may be implemented that may be by the control circuit 13.

FIG. 7 shows an example of a trust token validation algorithm that may be implemented that may be by the control circuit 13. In step S71, the control circuit obtains the first identification information ID. The first identification information ID can be a user secured PIN in the first embodiment discussed above, or the unit address of the destination set-top-box in the second embodiment discussed above.

In step S72, the control circuit obtains the hard drive unique identification information HD-UID from the hard drive 12. In step S73, the control circuit obtains the trust token from the hard drive 12.

In step S74, the control circuit decrypts and separates the trust token into decrypted identification information ("DID") and decrypted hard drive unique identification information ("D-HD-UID").

In step S75 the control circuit compares the obtained identification information ID from step S71 with the decrypted identification information DID from step S74, and in step S76 the control circuit compares the obtained hard drive unique identification information HD-UID with the decrypted hard drive identification information ("D-HD-UID").

In step S77 if the identification information ("ID") is not the same as the decrypted identification information, the algorithm proceeds to step S710 and determines that the validation has failed, in which case the set-top-box STB2 is not granted access to the hard drive 12. However, if the identification information ID is the same as the decrypted identification information DID, the processing proceeds to step S78.

In step S78, if the hard drive identification information HD-UID is not the same as the decrypted hard drive unique identification information D-HD-UID, the algorithm proceeds to step S710 and determines that the validation has failed, in which case the set-top-box STB2 is not granted access to the hard drive 12. However, if the hard drive identification information HD-UID is the same as the decrypted hard drive unique identification information D-HD-UID, the processing proceeds to step S79 and the control circuit determines that the validation is successful, in which case the set-top-box STB2 is granted access to the hard drive 12.

The present invention provides improved usability of set-top-boxes by enabling portability of external hard disk drives among plural set-top-boxes in the home and network. Content can be shared securely within the home or among set-top-boxes within a trust zone of the user. The present invention secures the external hard drive and not only the content on the external hard drive and therefore provides additional security against unauthorized access to the content stored in the external hard disk drive.

The present invention can be implemented not only as an apparatus or apparatuses, but also as a method including the steps conducted by the set-top-boxes as discussed above, which methods as discussed above constitute examples of algorithms. The invention can also be implemented as a program on a non-transitory computer-readable medium for causing a computer, such as a processor in a set-top-box, to execute such steps. The non-transitory computer-readable recording medium could be, for example, a CD-ROM, DVD, Bluray disc, or an electronic memory device.

The present invention may be implemented as any combination of a system, a method, an integrated circuit, and a computer program on a non-transitory computer readable recording medium.

The control circuit and any other parts of the set-top-boxes may be implemented as Integrated Circuits (IC), Application-Specific Integrated Circuits (ASIC), or Large Scale Integrated circuits (LSI), system LSI, super LSI, or ultra LSI components which perform a part or all of the functions of the set-top-boxes. Each of the parts of the present invention can be implemented using many single-function components, or can be one component integrated using the technologies described above. The circuits may also be implemented as a specifically programmed general purpose processor, CPU, a specialized microprocessor such as Digital Signal Processor that can be directed by program instructions on a memory, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

The present invention may be a non-transitory computer-readable recording medium having recorded thereon a program embodying the methods/algorithms discussed above for instructing a processor to perform the methods/algorithms.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory.

The sequence of the steps included in the above described algorithms is exemplary, and algorithms having a sequence other than the above described sequences are contemplated. Moreover, steps, or parts of the algorithm, may be implemented simultaneously or in parallel.

The components of the present invention can be in the form of a set-top box as in the exemplary embodiments disclosed above, or in other standalone devices, or may be incorporated in a television or other content playing apparatus, or other device, and the scope of the present invention is not intended to be limited on such forms.

It is also contemplated that the implementation of the components of the present invention can be done with any newly arising technology that may replace any of the above implementation technologies.

We claim:

1. An audio/video content management apparatus for use with an external hard drive, said audio content management apparatus comprising:
   an external hard drive interface circuit for detachably operationally connecting the audio/video management apparatus with the external hard drive;
   a control circuit configured to perform a trust token generation operation, wherein the trust token generation operation comprises:
      obtaining first identification information,
      obtaining hard drive identification information of the external hard drive,
      encrypting and combining at least the first identification information and the hard drive identification information as a trust token, and
   sending the trust token to the external hard drive via the external hard drive interface circuit, wherein the control circuit is configured to perform a trust token validation operation comprising:
      obtaining the first identification information,
      obtaining the hard drive identification information from the external hard drive via the external hard drive interface circuit,
      obtaining the trust token from the external hard drive via the external hard drive interface circuit,
      decrypting and separating the trust token into at least decrypted identification information and decrypted hard drive identification information;
      comparing the decrypted identification information with the first identification information obtained in the trust token validation operation;
   comparing the decrypted hard drive information with the hard drive identification information obtained in the trust token validation operation; and
   determining that the trust token is validated if the decrypted identification information matches the first identification information obtained in the trust token validation operation and the decrypted hard drive information matches the hard drive identification information obtained in the trust token validation operation.

2. The audio/video content management apparatus according to claim 1, wherein:
   the first identification information is a personal identification character string; and
   the audio/video content management apparatus further comprises an input unit to obtain input of the personal identification character string from a user.

3. The audio/video content management apparatus according to claim 1, wherein:
   the first identification information is a unit address of a destination apparatus for which validation of the trust token will enable access to the external hard drive.

4. The audio/video content management apparatus according to claim 3, wherein the destination apparatus is another audio/video content management apparatus.

5. The audio/video content management apparatus according to claim 3, wherein the destination apparatus is said audio/video content management apparatus.

6. The audio/video content management apparatus according to claim 1, wherein:
   the encrypting in the trust token generation operation comprises encrypting with a public key; and
   the decrypting in the trust token validation operation comprises decrypting using at least a private key.

7. The audio/video content management apparatus according to claim 1, further comprising the external hard drive.

8. An audio/video content management method comprising:

operationally connecting an audio/video management apparatus with an external hard drive;
performing a trust token generation operation, wherein the trust token generation operation comprises:
obtaining first identification information,
obtaining hard drive identification information of the external hard drive,
encrypting and combining at least the first identification information and the hard drive identification information as a trust token, and
sending the trust token to the external hard drive, further comprising performing a trust token validation operation comprising:
obtaining the first identification information,
obtaining the hard drive identification information from the external hard drive,
obtaining the trust token from the external hard drive,
decrypting and separating the trust token into at least decrypted identification information and decrypted hard drive identification information,
comparing the decrypted identification information with the first identification information obtained in the trust token validation operation,
comparing the decrypted hard drive information with the hard drive identification information obtained in the trust token validation operation, and
determining that the trust token is validated if the decrypted identification information matches the first identification information obtained in the trust token validation operation and the decrypted hard drive information matches the hard drive identification information obtained in the trust token validation operation.

9. The audio/video content management method according to claim 8, wherein:
the first identification information is a personal identification character string; and
the audio/video content management method further comprises obtaining input of the personal identification character string from a user.

10. The audio/video content management method according to claim 8, wherein:
the first identification information is a unit address of a destination apparatus for which validation of the trust token will enable access to the external hard drive.

11. The audio/video content management method according to claim 10, wherein the destination apparatus is another audio/video content management apparatus.

12. The audio/video content management method according to claim 10, wherein the destination apparatus is said audio/video content management apparatus.

13. The audio/video content management method according to claim 8, wherein:
the encrypting in the trust token generation operation comprises encrypting with a public key; and
the decrypting in the trust token validation operation comprises decrypting using at least a private key.

14. A non-transitory computer readable medium having stored thereon a program that causes a computer to implement an audio/video content management method comprising:

operationally connecting an audio/video management apparatus with an external hard drive;
performing a trust token generation operation, wherein the trust token generation operation comprises:
obtaining first identification information,
obtaining hard drive identification information of the external hard drive,
encrypting and combining at least the first identification information and the hard drive identification information as a trust token, and
sending the trust token to the external hard drive, wherein the method further comprises performing a trust token validation operation comprising:
obtaining the first identification information,
obtaining the hard drive identification information from the external hard drive,
obtaining the trust token from the external hard drive,
decrypting and separating the trust token into at least decrypted identification information and decrypted hard drive identification information,
comparing the decrypted identification information with the first identification information obtained in the trust token validation operation,
comparing the decrypted hard drive information with the hard drive identification information obtained in the trust token validation operation, and
determining that the trust token is validated if the decrypted identification information matches the first identification information obtained in the trust token validation operation and the decrypted hard drive information matches the hard drive identification information obtained in the trust token validation operation.

15. The non-transitory computer readable medium according to claim 14, wherein:
the first identification information is a personal identification character string; and
the audio/video content management method further comprises obtaining input of the personal identification character string from a user.

16. The non-transitory computer readable medium according to claim 14, wherein:
the first identification information is a unit address of a destination apparatus for which validation of the trust token will enable access to the external hard drive.

17. The non-transitory computer readable medium according to claim 16, wherein the destination apparatus is another audio/video content management apparatus.

18. The non-transitory computer readable medium according to claim 16, wherein the destination apparatus is said audio/video content management apparatus.

19. The non-transitory computer readable medium according to claim 16, wherein:
the encrypting in the trust token generation operation comprises encrypting with a public key; and
the decrypting in the trust token validation operation comprises decrypting using at least a private key.

* * * * *